United States Patent [19]

Matsuzawa et al.

[11] Patent Number: 5,278,384
[45] Date of Patent: Jan. 11, 1994

[54] APPARATUS AND PROCESS FOR THE TREATMENT OF POWDER PARTICLES FOR MODIFYING THE SURFACE PROPERTIES OF THE INDIVIDUAL PARTICLES

[75] Inventors: Yasuo Matsuzawa, Bedford, N.H.; Hans I. Wallsten, Denens, Switzerland; Hirotsugu K. Yasuda, Columbia, Mo.

[73] Assignee: Plasmacarb Inc., Wilmington, Del.

[21] Appl. No.: 985,277

[22] Filed: Dec. 3, 1992

[51] Int. Cl.$^5$ ............................................. B23K 9/00
[52] U.S. Cl. ..................... 219/121.36; 219/121.51; 219/121.37; 219/121.59; 219/121.48; 373/18; 75/10.19
[58] Field of Search ............ 219/121.36, 121.44, 219/121.37, 121.38, 121.48, 121.51, 121.59, 76.16, 76.15; 373/18-22, 156/345; 75/10.19, 10.22

[56] References Cited

U.S. PATENT DOCUMENTS

| | | | |
|---|---|---|---|
| 4,105,888 | 8/1978 | Fey | 219/121.48 |
| 4,469,508 | 9/1984 | Amouroux et al. | 219/121.36 |
| 4,818,837 | 4/1989 | Pfender | 219/121.51 |
| 4,918,282 | 4/1990 | Cheek | 219/121.37 |
| 4,948,485 | 8/1990 | Wallsten et al. | |
| 5,176,938 | 1/1993 | Wallsten et al. | |

Primary Examiner—Mark H. Paschall
Attorney, Agent, or Firm—Burns, Doane, Swecker & Mathis

[57] ABSTRACT

An apparatus for low temperature plasma treatment of powder particles for modifying the surface properties thereof, comprising means for the creation of a low pressure zone and, in association therewith, at least one cascade arc torch generator to form a plasma torch which is directed into said low pressure zone, means for the supply by gravity of powder particles to be treated into said low pressure zone and conduit means for the removal of the treated powder particles from said low pressure zone, said cascade arc generator having an orientation such that said plasma torch enters said low pressure zone at a downward angle ($\alpha$) to the horizontal of from about 15° to about 60°, and said conduit means being directed away from said plasma torch at an upward angle ($\beta$) to the horizontal of from about 15° to about 80°;

a process for low temperature plasma treatment of powder particles;

said apparatus and process enabling a high degree of reproducability and uniform particle size distribution.

19 Claims, 1 Drawing Sheet

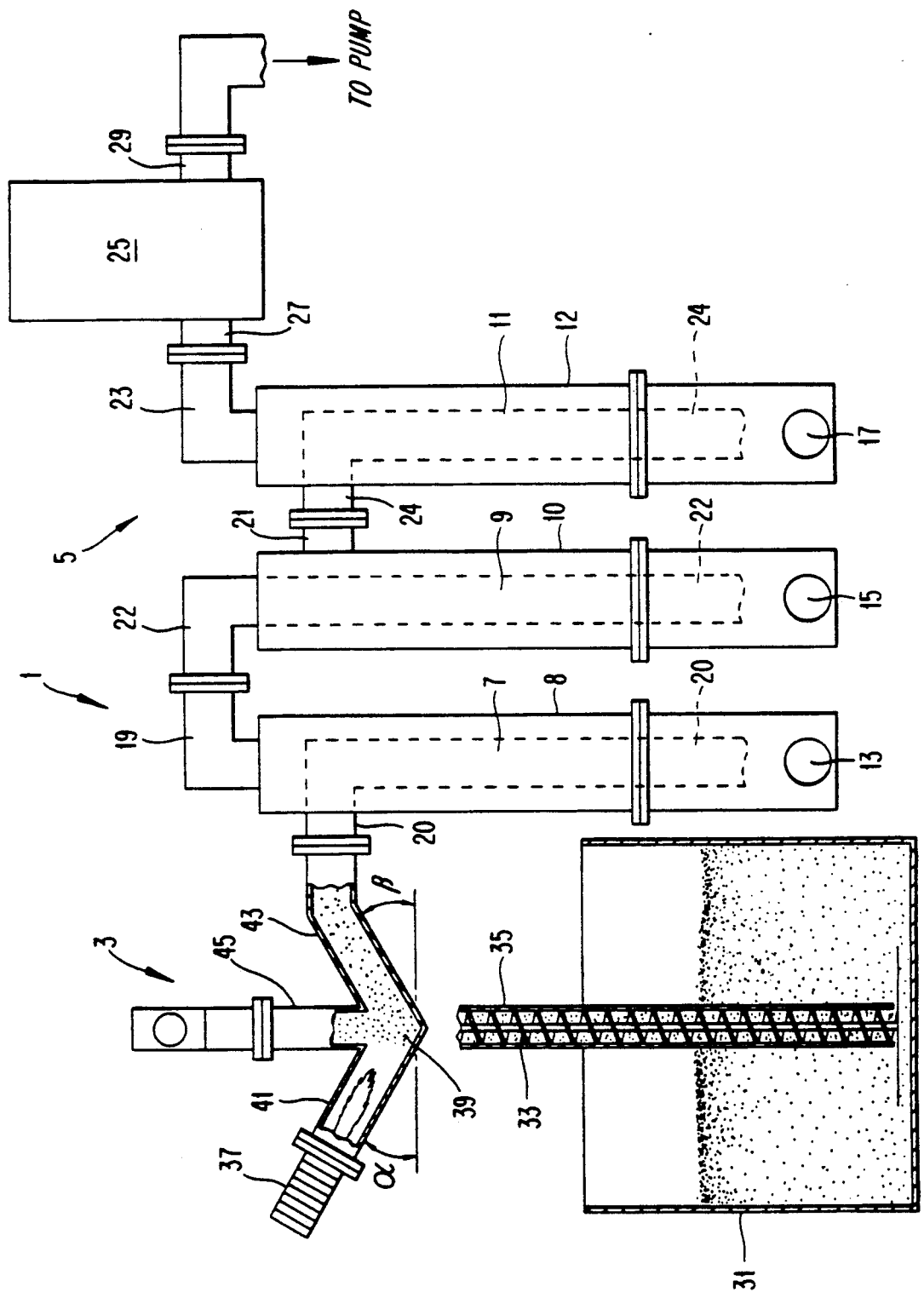

APPARATUS AND PROCESS FOR THE TREATMENT OF POWDER PARTICLES FOR MODIFYING THE SURFACE PROPERTIES OF THE INDIVIDUAL PARTICLES

The invention makes use of an arc torch generator of the cascade type for generating the plasma torch used in the treatment. The invention also covers a process for low temperature plasma treatment of powder particles for the modification of the surface properties thereof.

Surface treatment of powders for modifying the surface properties of the individual particles thereof is subject of continuous interest in various technological areas. Thus, metal powders or ceramic powders may need modification to increase flowability, to decrease the tendency to caking, to charge the surface of the particles negatively or positively etc. Such surface treatment can be obtained in many different ways. One method of performing surface treatment of powders is to use chemical compounds, such as surfactants, solvents, polymers or other chemicals. Such process also requires some mechanical milling step in order that the individual particles will be uniformly treated so that they obtain uniform surface properties.

Another treatment of powder particles is based on the use of low temperature plasma such techniques offering a relatively simple way of obtaining surface modification. It does not involve the use of several chemical compounds, such as surfactants and solvents. In such process chemically reactive species are obtained directly from the gas used in the plasma generation and said reactor species upon contact with the powder particles provide for the surface modification without the use of solvent systems. The process is performed in a vacuum which means that a subsequent drying process step will not be necessary.

In order to obtain a uniform surface modification of the individual powder particles agglomerates of particles have to be broken up to free the individual particles so that they will be uniformly treated. Furthermore, complications often arise in that the equipment used in the treatment process can be clogged up by particles which will disturb the operation of the process.

Copending U.S. application Ser. No. 527,315 (now U.S. Pat. No. 5,176,430) which is a continuation in part of application Ser. No. 274,775 now U.S. Pat. No. 4,948,485) describes a process and an apparatus for the surface treatment of powder particles using low temperature plasma techniques for the surface treatment of the individual particles of the pulverulent material. While the techniques described therein are of practical significance there are certain disadvantages in operation because of operational disturbances due to the character of the material to be treated. Thus, it is difficult to avoid clogging of conduits and other parts of the equipment and difficulties in association with the supply of powder to be treated, etc.

The present invention seeks to eliminate or at least significantly reduce the drawbacks associated with the prior art, such as that disclosed in U.S. Pat. No. 4,948,485 based on the use of a cascade arc plasma generator for performing plasma polymerisation including the treatment of powders.

Accordingly, the present invention has for a main object to provide new techniques for the surface treatment of pulverulent materials or powder particles.

Another object of the invention is to provide an apparatus for performing such surface treatment.

Yet another object is to provide a process for the surface treatment of the individual particles of a pulverulent material to modify or improve the surface properties thereof.

Still another object of the invention is to provide techniques which enable efficient surface treatment of powder particles, while avoiding operational disturbances associated with the behaviour of the powder to be treated.

Another object of the invention is to provide for modification of surface properties of powder particles using a cascade arc plasma generator.

For these and other objects the invention resides in an apparatus for low temperature plasma treatment of powder particles for modifying the surface properties thereof, said apparatus comprising means for the creation of a low pressure zone and, in association therewith, at least one cascade arc torch generator to form a plasma torch which is directed into said low pressure zone, further comprising means for the supply by gravity of powder particles to be treated into said low pressure zone and conduit or duct means for the removal of the treated powder particles from said low pressure zone. In such apparatus said cascade arc generator has such an orientation that the plasma torch enters the low pressure zone at a downward angle to the horizontal of from about 15° to about 60°, whereas said conduit means being directed away from said plasma torch at an upward angle to the horizontal of from about 15° to about 80°.

By the expression "downward" and "upward" is meant that the plasma torch enters the low pressure zone in a downward direction, whereas the conduit means has an upward direction, said directions referring to a horizontal plane. The expression "directed away from said plasma torch" used above means that the plasma torch enters the low pressure zone from one side and the conduit means for the treated powder leaves the pressure zone on the other side. It is preferred that the two directions are opposite directions, i.e. centered in a horizontal projection along an essentially straight line.

It is preferred that said downward angle and said upward angle are at least about 20° and that the downward angle suitably lies within the range about 20° to about 40° and the upward angle within the range of about 20° to about 50°. A particularly preferred range for both angles is from about 20° to about 25°.

The invention makes use of a conventional cascade arc torch generator for the treatment involved, and such apparatus is described more in detail in U.S. Pat. No. 4,948,485, the full disclosure of which is incorporated herein by reference.

In the apparatus according to the invention the plasma torch generated by the cascade arc torch generator results in active species being produced in the torch, and these active species intersect and collide with the powder particles supplied by gravity at a location remote from the torch, preferably about 8 cm to 25 cm away from the base of the torch, especially about 10 to 20 cm, such as about 15 cm away. Although this distance is not critical it is preferred, since if collision takes place within the arc the surface of the powder particles may become abraded, and if the distance is too large efficient treatment may not be obtained.

It is preferred in the apparatus according to the invention that it includes means for the introduction of a primary gas, such as argon, into the generator and, optionally, means are arranged for the introduction of a secondary gas, such as a monomer, upstream of the site of plasma torch expansion or of the base of the torch.

The powders to be treated using the techniques of the present invention for modifying the surface properties of the powder particles can take place with the gases, which do not polymerize to form a coating on the particles, such as ammonia, oxygen, water vapor, etc. On the other hand the surface treatment can involve the formation of a substantially uniform surface coating on each individual particle by introducing a monomeric polymerizable gas upstream of the base of the plasma flame. Such monomeric gas may be constituted by one or more monomers.

In a preferred embodiment of the apparatus of the present invention there may be included therein means for collecting the treated powder particles for recovering same. Such means may be constituted by a separating unit, where the particles are separated from the entraining gases.

The invention also provides for a process for low temperature plasma treatment of powder particles for modifying the surface properties thereof. Said process comprises the following steps:

a) creating a low pressure zone;

b) generating a cascade arc plasma torch and directing same into said low pressure zone at a downward angle to the horizontal of from about 15° to about 60°;

c) introducing by gravity powder particles into said low pressure zone to intersect therein with active species generated by said torch to result in modification of the surface of said particles;

d) removing said particles thus treated in a direction away from said torch and at an upward angle of from about 15° to about 80°; and e) collecting and recovering the treated particles.

As in the case of the apparatus it is preferred also in the process that the downward angle of step b) is from about 20° to about 40°, whereas the upward angle of the step is from about 20° to about 50°, it being particularly preferred that both angles are within the interval about 20° to about 25°.

It is preferred that the primary gas supplied for the plasma generation is selected from the noble gases, particularly argon.

The present invention as reflected by apparatus and process allows efficient surface treatment of discreet particles of a pulverulent material, and the invention is not restricted to the treatment of any particular type of pulverulent material. Thus, the material may consist of metal or metal alloy powders, metal compound powders, nonorganic, organic powders or ceramic powders. An interesting group of materials are iron and steel powders used in metal powder technology, and metal oxides. Another major group of materials are organic or inorganic pigments, such as pigments used in the automobile industry in paints. Also hard metals, such as tungsten and titanium carbides can be treated using the techniques of the present invention. Furthermore, aluminum powders, aluminum hydrate powders used for flame retardation for dispersion in polymers, and $SiO_2$ for example used as a filler.

In the alternative of applying plasma polymerisation in the treatment procedure the monomeric gas can be constituted by hydrocarbons and halogenated hydrocarbons, silanes, organo silanes and organometallic compounds, optionally together with hydrogen, $H_2O$ or chemically reactive gases.

As indicated before the powder particles collide with chemically active species generated by the plasma, said active species entering the low pressure zone at a supersonic speed. The high speed obtained is due to the large pressure drop taking place at the arc nozzle, where the low temperature plasma is generated using a direct current. The high velocity collision serves two objects in the present invention. First, it results in disintegration of aggregates or clusters of particles to bring them into a state where they are present as individual and discreet particles and second, mechanical mixing or agitation using external means can be suspended due to the effect of the collision.

The present invention provides for a number of advantages over the prior art. Among such advantages the following are worth mentioning.

The apparatus designed in accordance with the invention can be used for the treatment of powders on a large scale at high capacity. Furthermore, the capacity can be further increased by placing several units side by side. The equipment requires only limited space and can be easily automized to operate with a very restricted staff. Thus, one or several units placed side by side can easily be operated by only one person at a time.

The entire flow of gas and powder is maintained by a vacuum pump which has the capacity to maintain a vacuum level of preferably less than about 100 Torr, and especially less than about 10 Torr.

The invention will now be further illustrated by a non-limiting example of the apparatus of the invention and also by specific examples. The description will be made in conjunction with the appended drawing which shows a diagramatic side view of a preferred embodiment of the apparatus according to the invention.

The cascade arc reactor or generator shown in the drawing is generally designated 1 and includes a plasma generator part generally designated 3 and powder separation and collection equipment generally designated 5.

The separation and collection equipment 5 includes three parallel units 7,9,11 connected in series. Each unit includes a vertical cylindrical container 8,10,12 with powder discharge means 13,15,17 at the bottom thereof for the discharge of treated powder. Each unit 7,8,11 is provided with a gas outlet 19,21,23 at the top of the cylindrical container and is also provided with inlet tubes 20,22,24 also at the top of the cylindrical container. Each tube 20,22,24 extends downwardly inside the corresponding cylindrical container and concentric therewith down to a level at a distance from the bottom of the cylinder.

The last gas outlet 23 is connected to a filter via an inlet tube 27, and said filter is via an outlet tube 29 connected to a vacuum pump (not shown in the drawing).

The plasma generator part 3 is provided with a powder storage container 31 forming a storage for the powder to be treated. The powder is transported from a container 31 by means of a screw conveyor 33 upwardly through a conduit 35 extending behind the plasma generator proper and to the top of plasma generator part 3 for transfer into the low pressure zone of the apparatus.

A cascade arc torch generator 37 is via a conduit 41 connected to a low pressure zone 39. Conduit 41 extends away from the cascade arc torch generator 37 in a downward direction at an angle α to the horizontal, said angle within the range 20° to 25°. An outlet conduit 43 for the discharge of treated powder extends in an opposite direction to conduit 41 and at an upward angle β of from 20° to 25° to the horizontal. Finally, a vertically extending inlet conduit 45 for powder to be treated is attached to the junction between conduits 41,43 all three tubes 41,43,45 forming at the adjacent ends thereof a low pressure zone 39.

Although not explained in detail the different parts of the apparatus shown in the drawing can be attached to each other by flanges, welding or other conventional means not critical to the intended function of the apparatus.

In brief, the function of the apparatus described is as follows.

As previously indicated the powder to be treated is contained in powder container 31 and can be transported for treatment inside conduit 35 up to the inlet conduit 45 for untreated powder to be supplied to the low pressure zone 39.

Through the vacuum pump acting on the exit side of the plasma generator 3 the system is evacuated to a low pressure, such as within the range 1 to 10 Torr, and argon is introduced into the cascade arc torch generator 37 and an arc is generated by applying a dc voltage to the generator, the arc torch extending into conduit 41 for a distance short of the center of the low pressure zone 39. A monomer, if used, can be introduced upstream of the base of the flame, such as shown in U.S. Pat. No. 4,948,485.

Active species generated by the torch enter the low pressure zone at a supersonic speed and collide therein with the powder supplied through conduit 45 by gravity. Thus, the torch generated at the exit nozzle of generator 37 does not extend with its tip up to the collision zone between the active species and the powder particles but ends short of said zone say approximately 10 cm short of the collision zone in the example shown. After the treatment in the low pressure or reaction zone the treated powders leave the low pressure zone through conduit 43, and due to the configuration of the tubes 41,43,45 joining around the low pressure zone the powder particles cannot escape treatment before being discharged through outlet conduit 43.

The treated powder enters inlet tube 20 of the first unit 7 of the powder separation and collection equipment 5 and passes downwardly through tube 20, and the major part of the treated powder will be separated at the lower end of tube 20 in view of the drastic change of direction of flow and will be discharged through powder discharge means 13. The flow of gases containing a minor part of the treated powder continues up through cylindrical container 8 on the outside of inlet tube 20 and leaves unit 7 through gas outlet 19 from where it enters unit 9 where another fraction of the entrained powder particles are discharged at means 15. Finally, in unit 11, the last fraction of powder particles are removed from the flowing gases and discharged through discharge means 17. Any small traces of solid matter will be removed from the flowing gases by filter 25 and the flow of gases can then be recirculated back to the torch generator 37.

The invention will now be described by specific examples, wherein the apparatus shown in the drawing is used.

EXAMPLE 1

A ceramic powder, particle size 23.5 microns with a standard deviation of 11.6 microns (a powder received from Bonnier Technical Group, Eclepens, Switzerland) was treated in an apparatus as described above using argon as an inert gas and a silane compound, vinyltrimethylsilane, as a secondary gas, the following conditions being used: Argon flow rate 2000 sccm, flow rate of silane compound 50 sccm, dc argon arc power 700 watts, dc current 8.2 amps and dc voltage approximately 84 volts. The operating pressure is approximately 900 mTorr.

The treatment under the conditions given above imparts a changed texture to the ceramic powder, and the treated powder exhibits a dry and smooth texture. The flow capacity of the treated powder was compared to that of non-treated powder using a funnel. 30 g of the powder were placed in the funnel, and the funnel was vibrated to start the flow and the time for complete flow through the funnel was registered. Two funnels were used having an inner diameter of 4.5 mm and 9.0 mm, respectively. The results are summarized in Table I below:

TABLE I

| | | Flow time | |
|---|---|---|---|
| Sample | monomer for treatment | 4.5 mm | 9 mm |
| Nontreated | | no flow | no flow |
| Treated | Vinyltrimethylsilane | 30 sec | 3 sec |

As can be seen from the table the non-treated powder did not flow with the funnels used.

It was also found that the wetability of the powder changed from hydrophilic to hydrophobic. The treated powder did not result in caking when exposed to moisture, while the non-treated powder easily caked under such exposure.

The particle size and the particle size distribution were determined using a particle size analyser, Granulometer, CILAS 920. The solvent used was water with a dispersant, TX-100. The results are summarized in Table II.

TABLE II

| Sample | Median size | Diameter at 10% | Diameter at 97% | Mean | Stdn. |
|---|---|---|---|---|---|
| Nontreated | 22.97 | 10.34 | 48.08 | 23.93 | 11.63 |
| Treated | 21.68 | 11.69 | 34.34 | 21.23 | 7.88 | unit:microns

The table indicates that some size reduction takes place and that a narrower size distribution will be obtained due to the treatment.

EXAMPLE 2

A powder used for pearlescent cosmetics was treated in the same manner as described in Example 1 above. The powder is a mica coated with $TiO_2$ and is sold by Mearl Corporation, the particle size of the powder being in the range of approximately 1 to 10 microns. The chemical formula of mica is $KAl_2(AlSi_3O_{10})(OH)_2$ or $K(MgFe)_3(AlSi_3O_{10})(OH)_2$. This powder has a pearl-like appearance when spreaded.

The plasma treatment was performed using the same parameters as those described in Example 1 except for the monomer used being an organo silicon compound, hexamethyldisiloxane.

The treated powder had hydrophobic characteristics, and it did not mix with water, whereas the non-treated powder was hydrophobic and mixed well with water. The dispersion properties of non-treated and treated powder in some solvents are summarized in Table III below.

TABLE III

| Sample | Dispersion solvents | | | |
|---|---|---|---|---|
| | Water | Methanol | 1-Butanol | Hexane |
| Non-treated | D | D | S | S |
| Treated | S(1) | D | D | D |

D = Dispersed; S = Settled; S(1) Powder floats without mixing in water

EXAMPLE 3

Silicon dioxide, $SiO_2$, purchased from Aldrich Chemical was treated in the same manner as described above. The average particle size of the silicon dioxide used was approximately in the range of 1 to 10 microns. The same dc argon arc conditions as those described above were used, but a different monomer, trimethylsilane, was used to treat the silicon dioxide powder. The powder was subjected to a simple water dispersion testing in order to determine the effect of the modification of the surface of the particles by the treatment.

In this example also powder treated using argon only without a secondary gas or monomer was also compared with a non-treated powder in regard to its dispersion in water. Table IV below summarizes the results of water dispersion, the experiment results indicating that the powder treated with trimethylsilane obtained a strong hydrophobic characteristic.

TABLE IV

| Sample | Dispersion in water |
|---|---|
| Non-treated | D |
| Argon | D |
| Treated with TMS | N/D floats |

TMS = trimethylsilane; D = dispersion; N/D = no dispersion

EXAMPLE 4

An organic pigment, quinacridone red (purchased from Ciba Geigy, Switzerland) was treated in the same manner as described above in Example 1. The non-treated pigment particle has a median size of 0.84 microns and the particle size diameter at 10% is 0.73 microns and the majority, which is constituted of 97%, has a particle size diameter of 2.76 microns.

The treatment of the quinacridone pigment was performed using ammonia gas and the following conditions: argon dc arc power 700 watts, argon dc current 8.3 amps and the dc voltage was 83 volts. Furthermore, the flow rate of argon was 2000 sccm and the flow rate of ammonia 2000 sccm.

In this example comparison was made between treatment in accordance with the invention and conventional plasma treatment also using ammonia gas. In the conventional plasma treatment there was used a tumbling method in order to agitate the pigment particles in the reactor. Unless the particles are fluidized by agitation in the reactor surface treatment cannot be performed using conventional plasma treatment. The power supply used for the conventional plasma treatment was with a radio frequency of 13.56 mHz, and the flow rate of ammonia was 100 sccm at a vacuum of approximately 100 mtorr. The rf-power was set at 150 watts and the treatment was carried out for 24 hours with 100 g of quinacridone pigment.

The results of the experiments carried out are summarized in Table V below.

TABLE V

Particle Size Analysis of Pigment Plasma Treated by Two Different Methods

| Description | Treatment Gas | Method | Size Distribution | | | Average & Std | |
|---|---|---|---|---|---|---|---|
| | | | median | diameter at 10% | diameter at 97% | Average | Std |
| Nontreated | — | — | 0.84 | 0.73 | 2.76 | 0.95 | 0.45 |
| $NH_3$ Treated | $NH_3$ | RF Plasma | 0.95 | 0.71 | 4.15 | 1.57 | 1.16 |
| $NH_3$ Treated | $NH_3$ | DC Cascade Arc | 0.82 | 0.72 | 0.98 | 0.83 | 0.06 |

As seen from the table the treatment resulted in a situation with no difference in the median sizes, said sizes being 0.84 microns for the non-treated pigment and 0.82 microns for the dc arc-treated pigment. The particle diameter at an accumulated amount of 97% was substantially reduced from 2.76 microns to 0.98 microns. The average size of the treated pigment was slightly reduced from 0.95 microns to 0.83 microns concommittant with a significant decrease in the standard deviation of the size of the treated particles, the decrease of the standard deviation being from 0.45 microns to 0.06 microns.

It is furthermore clear from the table that in using conventional plasma treatment the particle size had a tendency to increase upon treatment. Thus, for example, the diameter at an accumulated amount of 97%, increased to 4.15 microns from the size of the non-treated particles, 2.76 microns, and the average particle size also increased from 0.84 to 1.57 microns at a much higher standard deviation, namely 1.16 microns.

This example illustrates the efficiency of the plasma treatment carried out in accordance with the present invention as compared to conventional plasma treatment. Thus, the present invention makes it possible to obtain a very uniform particle size as made clear by the data given in Table V. On the other hand, the conventional plasma treatment results in agglomeration due to surface interaction between the particles, something which causes uncertainty as to reducability and leads to uncontrolable particle size increase.

We claim:

1. An apparatus for low temperature plasma treatment of powder particles for modifying the surface properties thereof, comprising means for the creation of a low pressure zone and, in association therewith, at least one cascade arc torch generator to form a plasma torch which is directed into said low pressure zone, means for the supply by gravity of powder particles to be treated into said low pressure zone and conduit means for the removal of the treated powder particles from said low pressure zone, said cascade arc generator having an orientation such that said plasma torch enters said low pressure zone at a downward angle ($\alpha$) to the horizontal of from about 15° to about 60°, and said conduit means being directed away from said plasma torch at an upward angle (β) to the horizontal of from about 15° to about 80°.

2. An apparatus according to claim 1, wherein said downward angle (α) is from about 20° to about 40°, and wherein said upward angle (β) is from about 20° to about 50°.

3. An apparatus according to claim 1, wherein active species generated in said plasma torch intersect and collide with the powder particles at a location about 10 to about 20 cm away from the site where plasma torch expansion takes place.

4. An apparatus according to claim 1, comprising means for the introduction of a primary gas, such as argon, into said generator, and, optionally, means for the introduction of a secondary gas, such as a monomer, upstream of the site of plasma torch expansion.

5. An apparatus according to claim 1, comprising means for collecting the treated powder particles.

6. A process for low temperature plasma treatment of powder particles for modifying the surface properties thereof, comprising the steps:
   a) creating a low pressure zone;
   b) generating a cascade arc plasma torch and directing same into said low pressure zone at a downward angle to the horizontal of from about 15° to about 60°;
   c) introducing by gravity powder particles into said low pressure zone to intersect therein with active species generated by said torch to result in modification of the surface of said particles;
   d) removing said particles thus treated in a direction away from said torch and at an upward angle of from about 15° to about 80°; and
   e) collecting and recovering the treated particles.

7. A process according to claim 6, wherein the downward angle of step b) is from about 20° to about 40°.

8. A process according to claim 6, wherein the upward angle of step b) is from about, 20° to about 50°.

9. A process according to claim 6, comprising the further step of introducing besides a primary gas, also a monomeric secondary gas upstream of the site of plasma torch expansion, whereby functional groups can be incorporated onto the powder particles.

10. A process according to claim 6, wherein said secondary gas is selected from the group comprising hydrocarbons, halogenated hydrocarbons, silanes, and organosilicic compounds.

11. A process according to claim 6, wherein said primary gas is selected from the noble gases, such as argon.

12. A process according to claim 6, wherein said secondary gas is selected from the group comprising: air, nitrogen, oxygen, and ammonia.

13. A process according to claim 6, wherein the powder particles to be treated are selected from inorganic and organic pigments, metal powders, metal oxide powders, polymer particles and powders for pharmaceutically acceptable carriers.

14. An apparatus according to claim 2, wherein active species generated in said plasma torch intersect and collide with the powder particles at a location about 10 to about 20 cm away from the site where plasma torch expansion takes place.

15. An apparatus according to claim 2, comprising means for the introduction of a primary gas, such as argon, into said generator, and, optionally, means for the introduction of a secondary gas, such as a monomer, upstream of the site of plasma torch expansion.

16. An apparatus according to claim 2, comprising means for collecting the treated powder particles.

17. A process according to claim 7, wherein the upward angle of step b) is from about 20° to about 50°.

18. A process according to claim 7, comprising the further step of introducing besides a primary gas, also a monomeric secondary gas upstream of the site of plasma torch expansion, whereby functional groups can be incorporated onto the powder particles.

19. A process according to claim 7, wherein said secondary gas is selected from the group comprising hydrocarbons, halogenated hydrocarbons, silanes, and organosilicic compounds.

* * * * *